Mar. 27, 1923.
L. F. STAFFORD ET AL
BUMPER
Filed Nov. 21, 1921
1,449,455
3 sheets-sheet 3
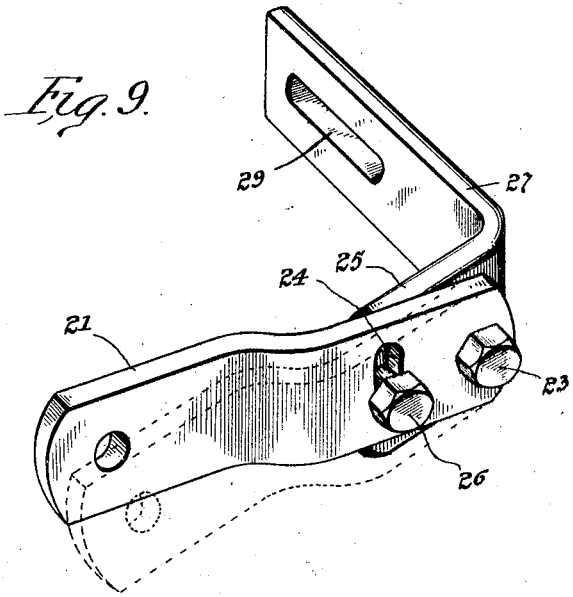
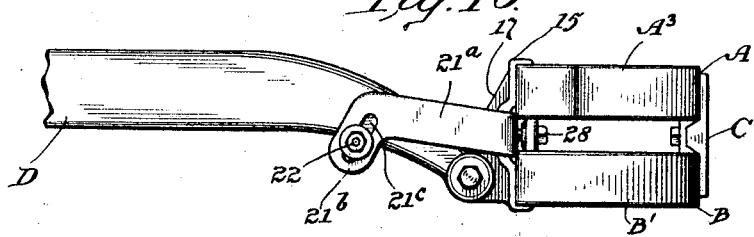
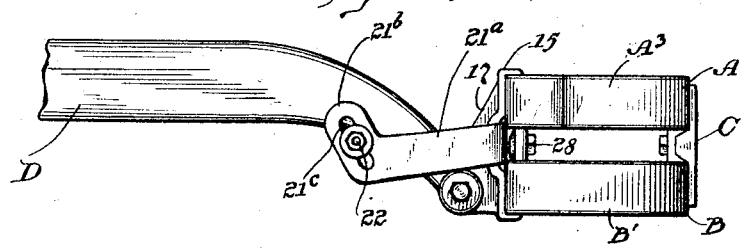
Inventors
Lewis F. Stafford
John D. Hale Patented Mar. 27, 1923.

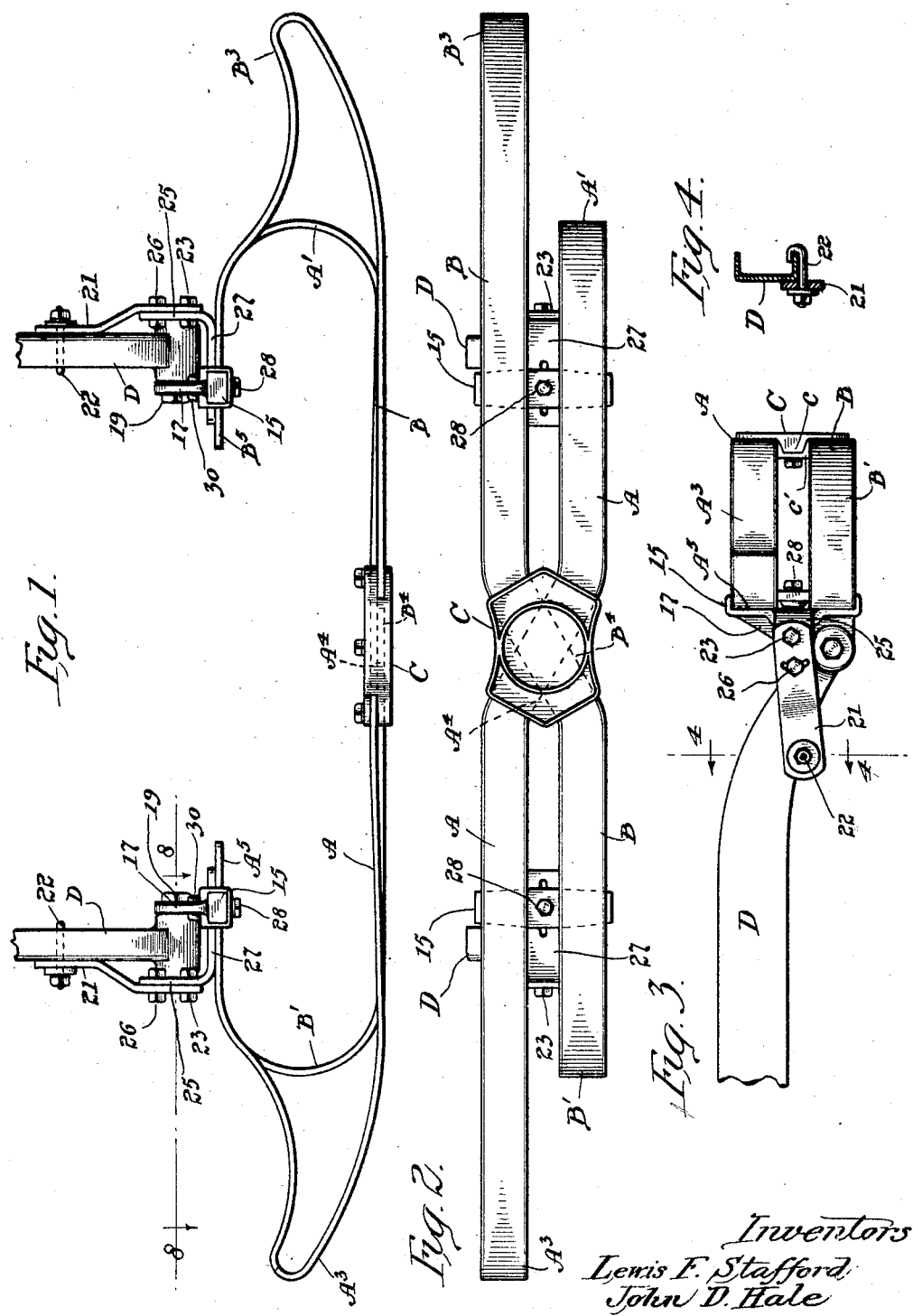

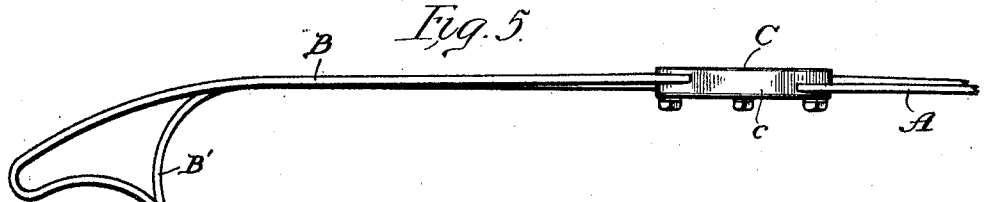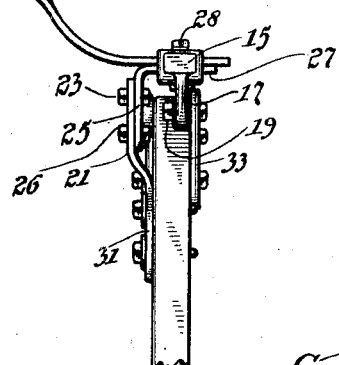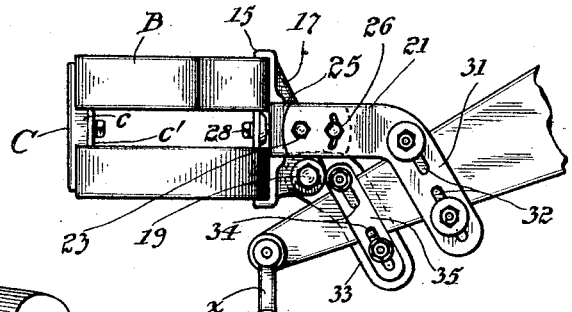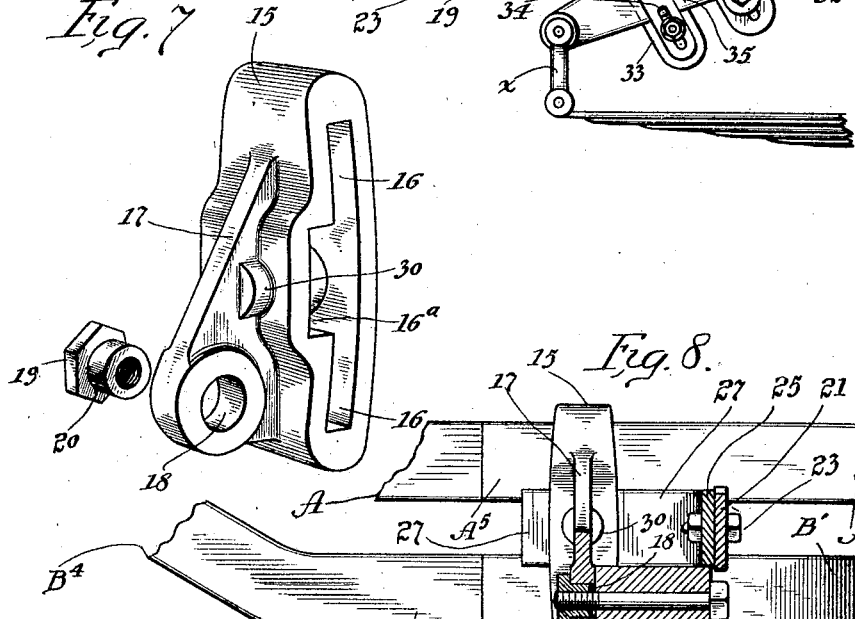

1,449,455

UNITED STATES PATENT OFFICE.

LEWIS F. STAFFORD AND JOHN D. HALE, OF CHICAGO, ILLINOIS, ASSIGNORS TO STAFFORD SPRING GUARD COMPANY, OF CHICAGO, ILLINOIS, A CORPORATION OF ILLINOIS.

BUMPER.

Application filed November 21, 1921. Serial No. 516,711.

*To all whom it may concern:*

Be it known that we, LEWIS F. STAFFORD and JOHN D. HALE, citizens of the United States, residing at Chicago, in the county of Cook and State of Illinois, have invented a new and useful Improvement in Bumpers, of which the following is a specification.

This invention relates to bumpers for the forward and rear ends of motor vehicles, and has more particular reference to bumpers having two bars or impact elements each of which is an independent or separate structure, but clipped to each other, and are provided with novel means for attachment to the vehicle or chassis thereof.

One of the objects of this invention resides in the provision of a bumper that has an impact area of greater extent than the width of the bars of which the structure is made, which arrangement is provided for by spacing the bars one above the other in substantially superposed relation, and crossing said bars at about the mediate point of the impact portion so that the ends of the bars may be connected to the vehicle at different locations. Another object is the provision of convenient means for attaching the structure to the vehicle so that it will accommodate itself to divers widths of vehicles as well as divers constructions of vehicle frames or chassis: in other words, to provide the bumper with attaching means whereby it is universally adaptable to different makes of cars without the use of special parts or tools. A further object is the provision, in connection with the attaching means, of an element or elements that permit of a reversal of the bumper parts so that the same may be attached to either front or rear of the vehicle without the use of additional parts. Still other objects reside in the provision of a bumper structure which is strong and durable in construction, comparatively easy of fabrication, economical to manufacture, and novel and dependable in operation.

In carrying out this invention it is preferred to employ the structure illustrated in the accompanying drawings that disclose preferred embodiments thereof; said drawings being, in a sense, merely diagrammatic for the purpose of illustration.

In the drawings:

Figure 1 is a top plan of the invention illustrating the bumper structure and the attaching means mounted upon the front or forward end portion of a motor vehicle chassis.

Figure 2 is a vertical front elevation of the structure shown in Figure 1.

Figure 3 is a vertical side view of the structure shown in Figure 1.

Figure 4 is a detail transverse section taken on line 4—4, Figure 3.

Figure 5 is a top plan of a portion of a bumper showing the manner of attachment to the back or rear end portion of a motor vehicle chassis.

Figure 6 is a vertical side view of the structure illustrated in Figure 5.

Figure 7 is an enlarged detail in perspective of a portion of the attaching structure with the parts removed.

Figure 8 is a transverse section taken on line 8—8, Figure 1.

Figure 9 is an enlarged detail, in perspective, of a portion of the attaching or securing means shown detached from the other parts for clearness.

Figure 10 is a vertical side elevation of a bumper mounted upon a chassis element and showing a slightly modified construction of attaching means.

Figure 11 is a view similar to Figure 10 of the same attaching means with the latter reversed to show the interchangeability thereof for attachment to a differently shaped chassis element.

In the drawings similar reference characters have been employed throughout the several views to designate the same parts.

As before stated, the structure comprises two separate bumper bars, each having impact-receiving portions A and B, respectively, that extend across the front or rear of the vehicle, and one end of each bar is given a substantially semi-circular bend A' and B', as shown in Fig. 1, and then continues straight, as seen at $A^2$ and $B^2$ (Fig. 8), substantially parallel with the straight portions A and B. The opposite end portions of each bar at the ends of the respective front portions are bowed slightly inwardly towards the vehicle and given relatively short hair-pin turns to provide outwardly extending horns $A^3$ and $B^3$ (Figs. 1 and 2), that project laterally or outwardly a distance beyond the semi-circular bends A' and B', respectively, of the other bar. That is, horn A³ projects beyond bend B' of the other bar, and at the opposite end of the bumper horn B³ projects beyond bend A'. The bars are disposed one above the other in superposed but spaced relation with their edges towards each other, and about midway the length of the bumper structure these bars are each given an oblique bend A⁴ and B⁴ so that the respective bars cross each other face to face and are secured together by a clip in the form of an escutcheon plate C that is provided with an interrupted rib c (Fig. 3) upon its edge and which is backed by a suitable plate c' and secured together by bolts, rivets, or any other convenient manner. After forming the hair-pin bends the respective bars are given a compound curvature and then continue for a straight stretch A⁵ and B⁵, parallel with their respective outer portions A and B and below the straight end portions A² and B² of the other end of the other bar so that all the ends are disposed substantially in one and the same vertical plane.

The means for attaching the bumper structure just described is as follows:—A suitable holder 15 (Fig. 7) is provided for each end of the bumper that is of a height sufficient to receive and have passed therethrough the approximately straight end portions A², B² and A⁵ and B⁵. To do this, holder 15 is provided with a vertically elongated slot 16, the width of which slot is slightly wider than the thickness of the metal bars of which the bumper body and arms are fabricated so that said arms may be readily inserted into said slot and adjustably secured therein. Extending laterally from one of the faces of the holder is a reinforcing and attaching rib or fin 17 that diverges from the holder towards its lower end where it is provided with an aperture 18 to receive a shouldered or sleeve nut 19, the reduced portion or shank 20 thereof being shorter than the depth of aperture 18. The interior of the nut and its sleeve is bored and threaded so that it may be substituted for the usual retaining nut on the end of the adjacent chassis horn D of the vehicle and when the nut is tightened into aperture 18 the end of the sleeve will not protrude beyond the opposite face of rib 17 to interfere with the firm gripping of the structure in position upon the chassis horn. Intermediate its ends slot 16 is widened, as at 16ª in Fig. 7 of the drawings, to receive the adjacent portion of an attaching bracket now to be described. This structure, broadly speaking, comprises an L-shaped device one portion whereof is secured to the vehicle and the other portion whereof, which is laterally disposed thereto, is inserted into the widened portion 16ª of slot 16 in the holder. At this point it may be stated that the distance between the adjacent edges of the straight end portions of the bumper bars is less than the width of the lateral portion of the L-shaped bracket element so that when said lateral portion is clamped in the holder, as hereinafter described, the said straight end portions of the bumper bar will thereby be also rigidly clamped in the holder. It might also be stated that in connection with the broad disclosure of this bracket that the respective longitudinal and lateral portions thereof are obliquely disposed with respect to each other, as seen in Figs. 9, 10 and 11 of the drawings, to permit of a wide range of adaptability of the structure to divers locations upon the vehicle and to divers makes or designs of vehicles. In the particular type of bracket illustrated in Figs. 1 to 9 of the drawings, the structure consists of a longitudinally disposed piece of metal 21 that is apertured at one end to receive the shank of a hooked end or J-shaped bolt 22 that passes through the aperture and has its hooked end engaged with the flange of the angle metal sill of the chassis frame in the manner illustrated in detail in Fig. 4 of the drawings. The opposite end of this piece 21 is also apertured to receive a pivot bolt or rivet 23, and between these end apertures the piece 21 is provided with a segmental slot 24, the center whereof is struck from the axis of pivot element 23 and is positioned transversely of said piece 21, as seen in detail in Fig. 9. Pivotally carried by pivot 23 is a substantially L-shaped piece of metal one end or arm 25 whereof lies flat against the adjacent end portion of piece 21 and is provided with an extension, preferably in the form of a bolt 26 that passes through segmental slot 24 in order to limit the relative movement of the two pieces with respect to each other, as will be understood, to permit of desired adjustment of the bumper and attaching parts to divers constructions of vehicles, and to hold the parts in position after adjustment. The lateral arm 27 of this L-shaped piece adjustably fits into the widened portion 16ª of the slot 16 in holder 15 before described in which position its upper and lower edge portions will slightly overlie and contact the adjacent faces of the straight ends A², B² and A⁵ and B⁵ of the bumper arms. The structure is secured together by a bolt 28 that passes through the outer wall of holder 15, through a suitable opening 29 in bracket arm 27 and is tapped into a threaded boss 30 upon the opposite face of the holder, and in order to permit of the adjustment of the attaching means and the bumper arms, opening 29 of the bracket arm is longitudinally elongated, as in Fig. 9.

In Figs. 10 and 11 are illustrated a modified bracket structure wherein the two parts shown in the other figures have been made integral, the longitudinal arm 21ᵃ being bent askew at the corner bend so that the element may be removed from one side of the chassis and secured upon the opposite side thereof to provide an inclination or declination, as desired, to fit different shapes or curvatures of chassis horns. Also the inner end portion of arm 21ᵃ is provided with an oblique lateral extension 21ᵇ that has an elongated slot 21ᶜ to receive bolt 22 for attachment to the sill of the chassis.

The bumper body and the holders above described are well adapted for attachment to the rear of the vehicle by slight modification of the bracket structure so that it is not necessary to supply a special bumper body and holder, but merely the brackets and arms. This structure is illustrated in Figs. 5 and 6 of the drawings, and consists in elongating bracket arm 21 and providing it with a downwardly projecting extension 31 having apertures 32 to receive J-bolts to clamp both the flanges of the sill of the chassis at the rear horn thereof forward of the spring shackle $x$. Owing to the usual spring construction at the rear of most motor vehicles it is not desirable to connect rib 17 of the holder to the shackle bolt in the manner used at the front of the vehicle, and in lieu thereof a plate 33 is provided the upper portion whereof is connected through aperture 18 to the lower portion of rib 17. This plate is secured to the rear chassis horn by bolts that pass through the plate upon opposite sides of the chassis sill and through elongated slots 34 in a suitable plate 35 positioned upon the side of the sill opposite bracket plate 33.

What is claimed is:

1. A bumper for motor vehicles comprising two impact-receiving bars, the ends of each bar formed into rearwardly extending arms spaced above each other in different horizontal planes and in the same vertical plane, holders to which the ends of different arms are adjustably secured, and brackets extending from the vehicle and through said holders in contact with the respective ends of adjacent arms whereby the securing of said brackets in said holders also secures said arms therein.

2. A bumper for motor vehicles comprising two bars extending across the width of the vehicle and provided with suitable arms for attachment to the vehicle, each bar adjacent one of its arms provided with a substantially semi-circular bend and adjacent its opposite arm provided with an elongated loop that extends beyond the adjacent bend of the other bar, oblique portions provided in said bars intermediate the ends of each whereby the before-mentioned arms of each bar are disposed in spaced superposed relation to each other.

3. In combination with a bumper for motor vehicles having an impact receiving area and arms for attachment to a vehicle, of attaching means therefor comprising a holder suitably connected to the vehicle and to said arms, and an L-shaped member removably connected with said holder the outer arm of which member is disposed oblique to the horizontal plane, whereby by the changing of the relative position of said member, the position and presentation of the attaching means is changed and controlled.

4. A bumper attaching structure comprising a holder suitably secured to the vehicle, and an L-shaped member extending therefrom and attached to the vehicle, one of the arms of said member being inclined oblique to a horizontal plane and arranged to have a limited adjustment in a vertical direction with respect to said holder.

5. Means for attaching a bumper to a vehicle comprising a holder constructed to receive the end portions of the bumper and suitably secured to the vehicle, and a bracket also secured to the vehicle and having an obliquely disposed extension the outer portion whereof is connected to said holder.

6. A bumper for motor vehicles comprising two bars extending across the width of the vehicle and provided with suitable arms for attachment to the vehicle, each bar adjacent one of its arms provided with a substantially semi-circular bend and adjacent its opposite arm provided with an elongated loop that extends beyond the adjacent bend of the other bar, oblique portions provided in said bars intermediate the ends of each whereby said bars reverse their vertical relations at their respective ends.

7. A bumper for motor vehicles comprising two bars extending across the width of the vehicle each bar provided adjacent one of its ends with a substantially semi-circular bend and adjacent its opposite end with an elongated loop that extends beyond the adjacent semi-circular bend of the other bar, the ends of the bars beyond the aforesaid bends extending towards each other and providing attaching arms parallel with the front portions of said bars, and a holder for each pair of arms for attachment to the vehicle.

8. A bumper for motor vehicles comprising two bars extending across the width of of the vehicle in superposed relation and in substantially the same vertical plane, the ends of said bars formed into attaching arms extending towards each other from opposite sides of the vehicle and provided with curved spring formations between said arms and the outer portions of said bars, and holders for receiving and attaching opposite pairs of arms to the vehicle.

9. A device for securing a bumper to a vehicle comprising a bracket provided with a slot to receive the ends of strap-metal members, means for securing said members in said slot; said bracket having a lateral extension provided with an aperture to receive the vehicle spring-bolt, and a sleeve nut the shank thereof entering said aperture.

10. A device for securing a bumper to a vehicle comprising a bracket provided with a slot to receive portions of the bumper, means for adjustably securing the bumper portions in said slot, a lateral extension connected to the vehicle spring-bolt, and an arm extending from said bracket and connected to the vehicle at a point independent of the vehicle spring-bolt.

11. In a structure of the kind specified, a plurality of bumper members positioned one above the other, and means connecting said members to the vehicle comprising arms carried by the vehicle and extending to and disposed alongside said bumper members intermediate the same, and clamps each provided with a vertical slot through which the bumper members extend, the slot being enlarged intermediate its ends to receive a portion of its respective arm.

Signed at Chicago, county of Cook, and State of Illinois, this 7th day of November, 1921.

LEWIS F. STAFFORD.
JOHN D. HALE.